United States Patent [19]

Wenning, Jr. et al.

[11] 3,862,844

[45] Jan. 28, 1975

[54] SnO₂ CONTAINING LEAD SILICATE GLASS HAVING A LOW MELTING POINT

[75] Inventors: William F. Wenning, Jr., Beaver Falls, Pa.; Louis A. Blanco, Tuckahoe, N.Y.

[73] Assignee: Ceramic Color & Chemical Manufacturing Co., New Brighton, Pa.

[22] Filed: Nov. 3, 1972

[21] Appl. No.: 303,620

[52] U.S. Cl. .................................. 106/49, 106/53
[51] Int. Cl. ......... C03c 3/10, C03c 3/30, C03c 5/00
[58] Field of Search ............................... 106/49, 53

[56] References Cited
UNITED STATES PATENTS

| | | | |
|---|---|---|---|
| 2,225,162 | 12/1940 | Deyrup | 106/49 |
| 2,245,541 | 6/1941 | Goodwin | 106/49 |
| 2,278,868 | 4/1942 | Deyrup | 106/49 |
| 2,338,099 | 1/1944 | Deyrup | 106/49 |
| 2,356,317 | 8/1944 | Harbert | 106/49 |
| 2,909,438 | 10/1959 | Kantz | 106/49 |
| 3,055,762 | 9/1962 | Hoffman | 106/53 |
| 3,099,569 | 7/1963 | Andrews et al. | 106/49 |
| 3,331,777 | 7/1967 | Hoffman | 106/53 |
| 3,383,225 | 5/1968 | Stradley | 106/49 |
| 3,586,522 | 6/1971 | Hoffman | 106/53 |

*Primary Examiner*—Winston A. Douglas
*Assistant Examiner*—Mark Bell
*Attorney, Agent, or Firm*—Lerner, David, Littenberg & Samuel

[57] ABSTRACT

A low melting point glass flux or frit is provided which is especially adapted for use as a protective layer for overglaze decalcomanias and applied ceramic decorations and is substantially resistant to both acid and alkali attack, to mechanical abrasion, and inhibits release of lead, cadmium and other toxic substances normally found in decalcomanias and vitreous ceramic decorations. The frit is comprised of increments of lead oxide, silicon dioxide, cadmium oxide and tin oxide, and optionally titanium dioxide. It can include substituents of conventional frits as well.

12 Claims, No Drawings

SnO₂ CONTAINING LEAD SILICATE GLASS HAVING A LOW MELTING POINT

BRIEF SUMMARY OF THE INVENTION

The present invention relates to a low-melting point frit which contains tin oxide or combinations of tin oxide and titanium dioxide.

BACKGROUND OF THE INVENTION

It has been found that the shortcomings of conventional protective barriers of glass, employed in decalcomanias, and vitrifiable decorations, in inhibiting release of toxic materials from the design layer of the decalcomania or said decoration are attributed primarily to the chemical make-up of the glass itself. Most glasses used as a protective barrier are lead boro-silicate glass containing various additives to build-in various desirable properties in the blass. For example, such glass may include zirconium dioxide ($ZrO_2$) in amounts as high as up to 15 percent by weight or more to impart resistance to alkali attack, and titanium dioxide in amounts up to 15 percent or more to impart resistance to acid attack. It is theorized that zirconium and/or titanium can be employed in such large quantities because they are basically compatible with the other glass-forming constituents and fit nicely into the lattice or matrix structure of the glass. However, these metallic oxides are not entirely satisfactory because they tend to adversely affect colors of the design layer. Attempts have been made to incorporate other materials into the glass matrix to overcome the shortcomings of the zirconium and titanium additives in connection with lead release without much success.

The applicants have invented a low melting point glass or frit, which overcomes the disadvantages attendant with prior art frits.

OBJECTS

It is accordingly an object of the present invention to provide a low-melting point glass frit which when employed as a protective layer over a design layer of a decalcomania or over any vitrifiable decoration is resistant to chemical and mechanical attack as well as lead and/or cadmium release from the design layer or decoration.

BRIEF DESCRIPTION OF THE INVENTION

In accordance with the invention, there is provided a low melting point glass flux or frit especially adapted for use as a protective layer for overglaze decorations and is substantially resistant to attack by acid and/or alkali and to mechanical abrasion and inhibits release of lead, cadmium and other toxic substances normally found in decalcomanias and applied ceramic decorations. The frit comprises increments of lead oxide, silicon dioxide, cadmium oxide, tin oxide, boric oxide and in preferred embodiments titanium dioxide, alkali oxides, alumina and/or small amounts of zirconium dioxide.

DISCUSSION OF PRIOR ART

The art is replete with frit or glaze compositions for various uses, which include tin oxide and/or titanium dioxide. For example, U.S. Pat. No. 3,586,522 to Hoffman discloses glass-ceramics precursors which are glasses of a composition consisting essentially of:

|  | Percent by Weight |
|---|---|
| $SiO_2$ | 20–38 |
| $PbO$ | 21–45 |
| $Al_2O_3$ | 1–25 |
| $TiO_2$ | 2–20 |
| $BaO$ | 2–15 |
| $ZnO$ | 0–25 |
| $PbF_2$ | 0–15 |
| $SrO$ | 0–5 |
| $ZrO_2$ | 0–5 |
| $Ta_2O_5$ | 0–5 |
| $WO_3$ | 0–5 |
| $CdO$ | 0–5 |
| $SnO_2$ | 0–5 |
| $Sb_2O_3$ | 0–5 |

However, such glass composition would not be useful, as would the frit of this invention in that it does not include boric oxide and combinations of tin oxide and cadmium oxide.

U.S. Pat. No. 3,000,745 to Cianchi discloses vitreous dielectric material containing crystalline material comprising a mixture of the following oxides in the following proportions:

|  | Parts by weight |  | Parts by weight |
|---|---|---|---|
| $TiO_2$ | 14–35 | $Sb_2O_3$ | 0.5–3 |
| $PbO$ | 10–30 | $K_2O$ | 7–20 |
| $BaO$ | 10–30 | $Na_2O$ | 1–5 |
| $SiO_2$ | 6–25 | $Li_2O$ | 1–5 |
| $SnO_2$ | 2–25 | $MgO$ | 0.5–5 |
| $CaO$ | 2–10 | $P_2O_5$ | 0–5 |
| $SrO$ | 2–10 | $B_2O_3$ | 0–5 |
| $ZrO_2$ | 1–6 |  |  |

U.S. Pat. No. 2,909,438 to Kautz discloses vitreous enamel compositions for aluminum and its alloys which have the following composition:

|  | Range in Weight (Percent) |
|---|---|
| $ZnO$ | 0.5–10.0 |
| $K_2O$ | 5.0–25.0 |
| $Na_2O$ | 5.0–25.0 |
| $SiO_2$ | 15.0–30.0 |
| $TiO_2$ | 15.0–35.0 |
| $B_2O_3$ | 1.0–15.0 |
| $Sb_2O_3$ | 3.0–13.0 |

Other aluminum-reduceable oxides can be used partially to replace the antimony trioxide. In this category are lead oxide PbO, which also acts as a flux and can be used in amounts up to about 25 percent, cadmium oxide CdO, in amounts up to 7.5 percent, cupric oxide CuO, in amounts up to 7 percent, cobaltous oxide CoO, in amounts up to 13 percent, nickelous oxide NiO, in amounts up to 13 percent, ferrous oxide FeO, in amounts up 13 percent, stannic oxide $SnO_2$ in amounts up to 8 percent, and molybdic oxide $MoO_3$ in amounts up to 6 percent.

Unfortunately, the large amounts of titanium dioxide required in the Kautz patent and the Cianchi patent mentioned hereinbefore, make these compositions undesirable for the intended use of the frit of the invention.

U.S. Pat. No. 3,418,156 to Medert, et al. discloses glazes having the following compositions:

| Oxide | Percent by Weight |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 |
| $ZrO_2$ | 0–16 |
| $TiO_2$ | 0–12 |
| CdO | 0–7.5 |
| CuO | 0–5 |
| ZnO | 0–4.5 |
| CoO | 0–4.5 |
| MgO | 0–3.5 |
| $Na_2O$ | 0–2.5 |
| $Fe_2O_3$ | 0–2.5 |
| BaO | 0–1.6 |
| $SnO_2$ | 0–1.5 |
| $K_2O$ | 0–1 |
| NiO | 0–0.8 |
| MnO | 0–0.8 |
| $Li_2O$ | 0–0.5 |
| $V_2O_5$ | 0–0.3 |
| $MoO_3$ | 0–0.3 |
| CaO | 0–0.3 |

U.S. Pat. No. 3,532,524 to Petticrew discloses glazes having the following compositions:

| Oxide | Percent by Weight |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–less than 1.9 |
| $SnO_2$ | 0–1.7 |
| $P_2O_5$ | 0–3 |
| BaO | 0–5 |
| ZnO | 0–3 |

Unfortunately, the Medert, et al. and Petticrew glazes are too high melting to be used as a protective coating to effectively inhibit lead and/or cadmium release from the design layer of a decalcomania.

DETAILED DESCRIPTION OF INVENTION

The tin oxide present in the low melting glass or frit of the invention has the formula $SnO_2$ and may be present in amounts ranging from about 2 percent to about 15 percent by weight and preferably from about 6 percent to about 8 percent by weight depending upon the other components present and the properties desired. Amounts greater than 15% $SnO_2$ would cause the frit to be too high melting and undesirable for the use intended as described herein. It is preferred that the tin oxide be employed in conjunction with from 0 percent to about 10 percent by weight and preferably from about 1 percent to about 6 percent and optimally from about 1 percent to about 3 percent by weight titanium dioxide ($TiO_2$). Use of amounts of $TiO_2$ greater than 10 percent is undesirable because of its deleterious effect on color stability of the design layer of a decal. However, where amounts of from about 10 percent to about 15 percent by weight tin oxide are employed, if desired, no titanium dioxide need be present; however, in such cases the base glass frit could be too high melting and thus must be reformulated so as to increase the amount of alkali oxides in the frit and thereby lower the melting point of the frit.

The tin oxide by itself imparts to the low melting point glass or frit excellent resistance to both acid and alkali attack, inhibits lead and/or cadmium release from a design layer of a decal and allows for expansion of the frit upon firing. Thus, a protective layer of the inventive low melting glass or frit acts as a shield to seal a decal applied to a ware and/or applied ceramic decoration from external attack and to seal in all toxic substances present in the design layer and thereby prevent contact of these toxic substances with food and drink.

The titanium dioxide by itself imparts to the low melting point glass or frit good resistance to acids. However, it is also deleterious to color stability of the design layer in that it promotes color changes therein. For example, the use of titanium dioxide alone tends to cause blues in the design layer to turn green and greens (e.g., chromium titanate) to turn yellow or gold.

Surprisingly and unexpectedly, it has been found that when tin oxide is employed in combination with and in conjunction with titanium dioxide, the combination imparts to the glass or frit increased resistance to acid attack and lead and/or cadmium release from the design layer, such resistance being substantially greater than that imparted by tin oxide alone or titanium dioxide alone. Furthermore, it has been found that the combination does not adversely affect the color stability of the design layer or resistance to alkali attack or expansion qualities of the glass or frit. Accordingly, it can be concluded that with respect to its propensity to impart to the frit resistance to acid attack and inhibit lead and/or cadmium release from the design layer, the combination of tin oxide and titanium dioxide, when employed in a low melting point frit, is indeed a synergistic combination, and surprisingly so. This synergistic combination includes tin oxide and titanium dioxide in a weight ratio to each other ($SnO_2:TiO_2$) within the range of from about 8:1 to about 1:5 and preferably from about 8:1 to about 3:1.

Depending upon the properties desired, the low melting point frit of the invention will include from about 15 to 65 percent and preferably from about 30 percent to about 40 percent by weight silicon dioxide ($SiO_2$) and from about 10 percent to about 50 percent and preferably from about 25 percent to about 35 percent by weight lead oxide (PbO) as the major glass-forming substituents.

The frit will also include from about 1 percent to about 10 percent and preferably from about 3 percent to about 9 percent by weight of a cadmium compound such as cadmium oxide (CdO) to impart color stability to the design layer of the decalcomania. the cadmium oxide inhibits the reds and yellows in the design layer from forming lead sulfide and thereby turning back.

The low melting frit of the invention may also include a wide variety of alkali oxides to impart desired properties thereto as will be seen hereinafter. For example, the firt may contain from 0 percent to about 20 percent and preferably from 3 percent to about 11 percent by weight sodium oxide and/or potassium oxide and from 0 percent to about 4 percent and preferably from about 0.5 percent to about 1.5 percent by weight lithium oxide to decrease the viscosity of the frit and thereby make it lower melting.

Furthermore, the frit may include alkaline earth metal oxides, such as oxides of calcium, magnesium and/or strontium in lieu of a portion of the alkali metal oxides mentioned above to adjust expansion characteristics of the frit. The alkaline earth metal oxides may be employed in amounts of up to about 5 percent and preferably from about 3 percent to about 5 percent by weight of the frit.

The frit may also include from 0 percent to about 20 percent and preferably from about 8 percent to about 16 percent by weight boric oxide ($B_2O_3$) as a so-called "coordination source of oxygen."

In addition, the frit may include from 0 percent to about 6 percent by weight alumina ($Al_2O_3$) to impart the desired viscosity characteristics to the frit.

Prior art low melting frits contain up to 15 percent by weight zirconium dioxide to impart resistance to alkali attack, for example by detergents, to the decalcomania. In the present invention, the use of zirconium dioxide is purely optional in that adequate alkali or detergent resistance is imparted to the frit by the tin oxide. However zirconium dioxide may be employed in the inventive frit in amounts within the range of from about 1 percent to about 4 percent by weight to enhance the already present resistance to alkali attack.

The low melting point frit of the invention can have a melting point within the range of from about 800°F to about 1,600°F, depending upon its chemical composition, and therefore is useful in a wide variety of ceramic decorating applications. Thus, for example, where a low melting (e.g., melts at less than 1,000°F) low viscosity, almost fluid-like frit or protective glass layer is desired, such as for use in low melting point wares (for example aluminum enamel) an increased content of tin oxide and titanium dioxide is required (e.g. 8–12 percent tin oxide and 2–5 percent titanium dioxide) and alkali oxides (such as sodium oxide and/or potassium oxide) can be added, for example in amounts up to 20 percent by weight and preferably in amounts from 7 to 11 percent by weight. In addition, the content of zirconium dioxide may be increased to impart desired resistance to alkali attack thereto. Inasmuch as frits with lower melting points are rather soft and have less resistance to chemical (especially acid) attack than higher melting frits, the quantities of tin oxide and titanium dioxide may be somewhat increased with concomitant increase in alkali oxides to impart the desired degree of chemical resistance while retaining the desired degree of fluidity in the frit.

Conversely, higher melting point frits which are more viscous, less fluid, harder and more resistant to chemical attack can be obtained by reducing the alkali oxide content thereof and increasing the tin oxide and titanium dioxide content thereof, for example by employing from 3 to 7 percent alkali oxides and from 7 to 8 percent tin oxide and 1 to 2 percent titanium dioxide. In such case, zirconium dioxide need not be employed, or if desired, employed in amounts of 1 percent or less.

Viscosity of the frit may also be somewhat influenced by the presence of alumina. Thus, where higher viscosity frits are desired, concentrations of alumina can be increased.

It will be appreciated by one skilled in the art that by so varying the amounts of alkali oxides and tin oxide and titanium dioxide employed in the frit, a frit of any desired melting point and fluidity can be obtained, for use with any desired ware, in accordance with the invention. The versatility of the low melting point frit of the invention is a primary advantage thereof.

In summary, the frit of the invention has the following formulation:

| Component | Range Percent by Weight |
|---|---|
| $SnO_2$ | 2 to 15 |
| $TiO_2$ | 0 to 10 |
| $SiO_2$ | 15 to 65 |
| $PbO$ | 10 to 50 |
| $B_2O_3$ | 0 to 16 |
| $CdO$ | 1 to 9 |
| Alkali Oxides | 0 to 20 |
| $Al_2O_3$ | 0 to 6 |
| $ZrO_2$ (optional) | 1 to 4 |

A preferred frit formulation in accordance with the present invention is as follows:

| Component | % by Weight |
|---|---|
| $SnO_2$ | 7 |
| $TiO_2$ | 2 |
| $SiO_2$ | 35 |
| $PbO$ | 29 |
| $B_2O_3$ | 11 |
| $CdO$ | 5 |
| $Li_2O$ | 1 |
| $Na_2O$, $K_2O$ mixture | 7 |
| $Al_2O_3$ | 3 |
| | 100% |

The low melting glass or frit may be prefused prior to application as a protective coating over a design layer or a decal. Thus, the various oxide components mentioned hereinbefore may be fused to form a glass in accordance with conventional techniques. Thereafter, the prefused glass is powdered so that it will have an average particle size within the range of from about .5 to about 12 microns prior to use.

However, if desired, the glass-forming oxide constituents can be formed into glass in situ on the design layer and at essentially the same time form a protective layer over the design layer.

Regardless of whether prefused frit or frit formed in situ is employed, it is essential that the frit so formed be fully matured (fluid) at the firing temperature so that it will fuse to the design layer to form a protective layer thereon and bond the design layer to the ware.

The glass or frit protective layer is colorless so that it does not interfere with or mask the colors of the design layer. However, the glass layer may include a metallic oxide in an amount within the range of from about 1 percent to about 8 percent by weight.

An amount of the low melting glass or frit should be deposited on the design layer so that the protective glass coating thereafter formed will have a thickness within the range of from about 6 to about 28 microns and preferably from about 9 to about 20 microns. Thus, the ratio of thickness of the glass protective coating to the design layer may be within the range of from about 1:1 to about 3½:1 and preferably from about 2:1 to about 2½:1.

The low melting frit of the invention may be employed in preparing decalcomanias as decorations for ceramic ware, glassware, pottery, aluminum enamel, or any other ware which melts at 1,600° F. or below.

The frit has wide application as a protective layer or glaze for ceramic decorations. When employed in combination with inorganic pigments (ceramic oxides), a wide spectrum of low lead and/or cadmium release colored vitreous coatings are produced suitable for on glaze and/or overglaze decorations.

What is claimed is:

1. A low melting point glass or frit especially adapted for use as a protective layer for overglaze decalcomanias and ceramic decorations, which protective layer is substantially resistant to attack by acid and/or alkali and to mechanical abrasion and inhibits release of lead, cadmium and other toxic substances normally found in such decalcomanias and applied ceramic decorations, and will not mask the colors of the design layer of such decalcomanias or decorations, consisting essentially of silicon dioxide in an amount within the range of from about 15 percent to about 65 percent by weight, lead oxide in an amount within the range of from about 10 percent to about 50 percent by weight, cadmium oxide in an amount within the range of from about 1 percent to about 10 percent by weight, tin oxide in an amount within the range of from about 2 percent to about 15 percent by weight, titanium dioxide in an amount from about 1 percent to about 6 percent by weight, boric oxide in an amount up to about 20 percent by weight, and alkali oxides in an amount up to about 20 percent by weight.

2. A low melting point glass in accordance with claim 1 comprising, in addition, from about 1 percent to about 4 percent by weight zirconium dioxide.

3. A low melting point glass in accordance with claim 1, including, in addition, up to about 6 percent by weight alumina.

4. A low melting point glass in accordance with claim 1, wherein the glass is prefused.

5. A low melting point glass in accordance with claim 1 having the following formulation:

| Component | Range % by Weight |
|---|---|
| $SnO_2$ | 6 to 8 |
| $TiO_2$ | 1 to 3 |
| $SiO_2$ | 30 to 40 |
| $PbO$ | 25 to 35 |
| $B_2O_3$ | 8 to 16 |
| $CdO$ | 3 to 9 |
| Alkali Oxides { $Na_2O$ and/or $K_2O$ | 3 to 11 |
| Alkali Oxides { $Li_2O$ | 0.5 to 1.5% |
| $Al_2O_3$ | 0 to 6. |

6. A low melting point glass in accordance with claim 5, further including 1 to 4 percent by weight of $ZrO_2$.

7. A low melting point glass in accordance with claim 5 of the following compositions:

| Component | % by Weight |
|---|---|
| $SnO_2$ | 7 |
| $TiO_2$ | 2 |
| $SiO_2$ | 35 |
| $PbO$ | 29 |
| $B_2O_3$ | 11 |
| $CdO$ | 5 |
| $Li_2O$ | 1 |
| $Na_2O$, $K_2O$ mixture | 7 |
| $Al_2O_3$ | 3. |

8. A low melting point glass in accordance with claim 1 wherein said alkali oxides comprise a member selected from the group consisting of sodium oxide and potassium oxide and mixtures thereof, in an amount of within the range of from about 3 percent to about 11 percent by weight, and lithium oxide in an amount within the range of from 0 percent to about 4 percent by weight.

9. A low melting point glass in accordance with claim 1 wherein said lead oxide is present in an amount within the range of from about 25 percent to about 35 percent by weight.

10. A low melting point glass in accordance with claim 9 wherein said alkali oxides comprise a member selected from the group consisting of sodium oxide and potassium oxide and mixtures thereof, and lithium oxide in an amount within the range of from about 0.5 percent to about 1.5 percent by weight.

11. A low melting point glass in accordance with claim 5 in admixture with inorganic pigments.

12. A low melting point glass in accordance with claim 11 wherein said inorganic pigments are low melting point vitreous colors.

* * * * *